US006148849A

United States Patent [19]

Green et al.

[11] Patent Number: 6,148,849

[45] Date of Patent: Nov. 21, 2000

[54] SAFETY VEHICULAR FUEL SYSTEM

[75] Inventors: Thomas E. Green, Mundelein; Anthony M. DiViesti, Arlington Heights, both of Ill.

[73] Assignee: Dynamic Safety, Inc., Mundelein, Ill.

[21] Appl. No.: 09/307,112

[22] Filed: May 7, 1999

[51] Int. Cl.[7] .................... F16K 15/02

[52] U.S. Cl. .................... 137/351; 137/38; 137/614.04; 123/198 D; 123/514; 123/544

[58] Field of Search .................... 123/198 D, 510, 123/514, 468, 469, 456; 137/68.14, 614.04, 544, 38, 351

[56] References Cited

U.S. PATENT DOCUMENTS

| | | | |
|---|---|---|---|
| 3,521,652 | 7/1970 | Reeks | 137/38 |
| 4,023,584 | 5/1977 | Rogers et al. | 137/68.14 |
| 4,044,746 | 8/1977 | Kaye | 123/511 |
| 4,609,004 | 9/1986 | Greene et al. | 137/38 |
| 4,907,616 | 3/1990 | Bergsma | 137/38 |
| 5,365,906 | 11/1994 | Deweerdt | 123/467 |
| 5,537,980 | 7/1996 | Yamamoto | 123/447 |
| 5,749,345 | 5/1998 | Treml | 123/456 |
| 5,791,317 | 8/1998 | Eck | 123/510 |

*Primary Examiner*—A. Michael Chambers
*Attorney, Agent, or Firm*—John R. Hoffman

[57] ABSTRACT

A safety system is provided for a vehicular fuel line installation which includes a fuel tank, an engine and delivery and return lines extending between the tank and the engine. A pump is operatively associated with the delivery line to feed fuel from the tank to the engine. Safety valves are provided in the delivery line at the pump and at the engine as well as in the return line at the tank and at the engine. A fuel filter is disposed in the delivery line and flexible hose sections may be disposed in the delivery line and/or the return line, and safety valves are disposed at opposite ends of the fuel filter and the flexible hose sections.

8 Claims, 1 Drawing Sheet

SAFETY VEHICULAR FUEL SYSTEM

FIELD OF THE INVENTION

This invention generally relates to vehicular fuel systems and, particularly, to a safety system in a vehicular fuel line installation.

BACKGROUND OF THE INVENTION

Many deaths and injuries occur from fires that result from fuel leakage or spillage during and after motor vehicle accidents. Such fuel leakage often is called "fuel line siphoning".

A typical vehicular fuel line installation is a closed loop fuel system that draws fuel from a fuel tank, delivers the fuel to an internal combustion engine and returns the unused fuel back to the fuel tank. In such a closed loop system, delivery and return lines extend between the fuel tank and the engine. A delivery unit, such as a pump, is operatively connected in the delivery line, and a fuel filter also is typically connected in the delivery line. One or more flexible hoses also may be connected in the delivery and/or the return lines.

From the foregoing, it can be understood that there are many component connections in the vehicular fuel line installation in order to perform the process of delivering and returning fuel to and from the engine and the fuel tank. Sudden impact of a vehicle may cause displacement of these connections resulting in separation of the closed loop lines. Fuel line siphoning may occur and present a serious risk of fire or explosion. If a spark ignites the fuel, the entire vehicle may quickly become engulfed in flames, trapping the vehicle occupants and causing serious injury or loss of life.

The present invention is directed to these problems by providing a safety system which involves safety valves at critical points of connections throughout the closed loop fuel line installation.

SUMMARY OF THE INVENTION

An object, therefore, of the invention is to provide a new and improved safety system in a vehicular fuel line installation of the character described.

The safety system includes a fuel tank for storing a quantity of fuel and an internal combustion engine remote from the fuel tank. Delivery and return lines extend between the tank and the engine. A pump is operatively associated with the delivery line to feed fuel from the tank to the engine. A safety valve is disposed in the delivery line at the pump for automatically closing in the event of an accident. Safety valves are disposed in the delivery line at the engine, in the return line at the engine and in the return line at the tank.

In addition, a fuel filter is located in the delivery line, and a safety valve is disposed in the delivery line at each of an inlet side and outlet side of the fuel filter. Flexible hose sections may be located in either the delivery line or the return line or both, and a safety valve is disposed at each opposite end of each flexible hose section.

In some installations, a vapor line extends between the fuel tank and the engine. The invention contemplates that a safety valve be disposed in the vapor line at least at one of the fuel tank and the engine.

As disclosed herein, at least one of the safety valves includes a pair of mating halves which are separable in response to tension on the valve. Each mating half includes a valve member which closes automatically in response to separation of the mating halves.

Finally, the invention contemplates a system wherein the delivery and return lines as well as the safety valves all are located generally along a front-to-rear centerline of a vehicle.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best under by reference to the following description taken in conjunction with the accompanying drawings, in which like reference numerals identify like elements in the figures and in which:

DETAILED DESCRIPTION OF THE PREFERRED EMBODIMENT

Figure 1:
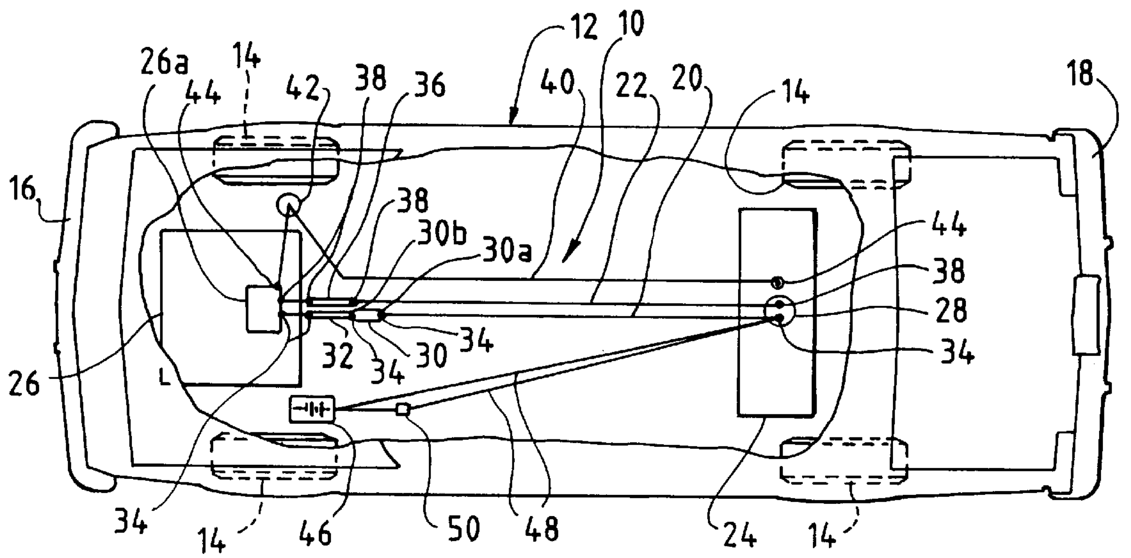
FIG. 1 is a somewhat schematic illustration of a vehicle incorporating the safety system of the invention.

Referring to the drawings in greater detail, and first to FIG. 1, the invention is embodied in a safety system in a vehicular fuel line installation, generally designated 10, of a vehicle, generally designated 12. The vehicle is shown as a typical passenger automobile including four tires 14, a front bumper 16 and a rear bumper 18. However, it should be understood that the invention is equally applicable for other vehicles such as trucks, buses and the like.

Fuel line installation 10 is a closed loop system including a delivery line 20 and a return line 22 extending between a fuel tank 24 and an internal combustion engine 26 which includes a fuel injector 26*a*. In the system, tank 24 stores a quantity of fuel which is fed to the engine through delivery line 20, and the unused fuel is returned back to the tank through return line 22.

A pump 28 is used to draw fuel from tank 24 and deliver the fuel through a line 20 and through a fuel filter 30 to the fuel injector of engine 26. A flexible hose section 32 may also be located in delivery line 20 to accommodate engine and/or drivetrain movement during frontal or other types of impact.

The invention contemplates that safety valves 34 be located in delivery line 20 at pump 28, at engine 26 or its fuel injector, at both an inlet side 30*a* and an outlet side 30*b* of fuel filter 30 and at opposite ends of flexible hose section 32.

Another flexible hose section 36 is shown in return line 22. The invention contemplates that safety valves 38 be located in return line 22 at pump 28, at engine 26 or its fuel injector and at opposite ends of flexible hose section 36.

A vapor line 40 may be provided between fuel tank 24 and engine 26 and include a vapor canister 42. The invention contemplates that a safety valve 44 be provided in vapor line 40 at fuel tank 24 and at engine 26 or its fuel injector.

Finally, FIG. 1 shows a battery 46 connected by electrical lines 48 to pump 28. A safety inertia switch 50 is located in one of the battery lines to shut off electrical current in the event of an impact of a certain magnitude. The inertia switch is a resettable switch.

Figure 2:
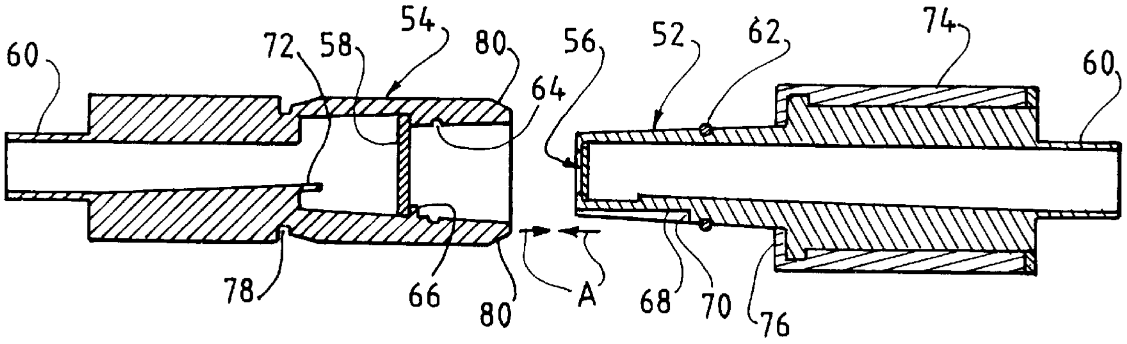
FIG. 2 is an axial section through the two halves of a safety valve contemplated by the invention.
Figure 3:
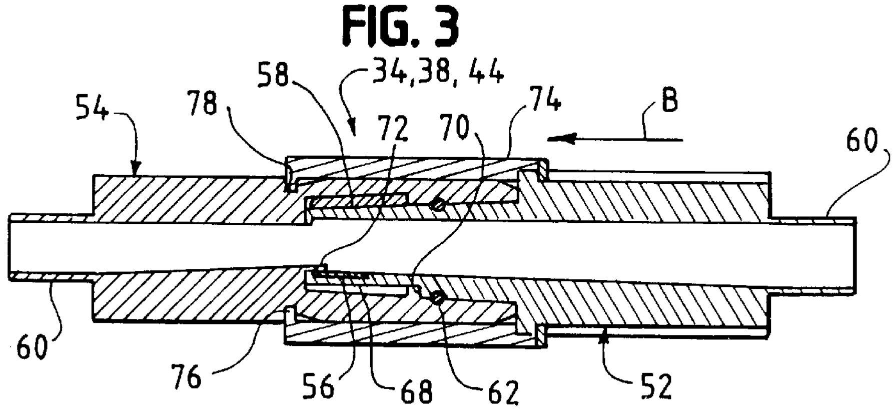
FIG. 3 is an axial section showing the safety valve of FIG. 2 in connected condition.

FIGS. 2 and 3 show a type of safety valve which may be used for the safety valves 34, 38 and 44 in the safety system for the vehicular fuel line installation 10 described above in relation to FIG. 1. In particular, the safety valve includes a pair of mating halves, including a male connector, generally designated 52, and a female connector, generally designated 54. Connector 52 has a spring-loaded flapper valve 56 and connector 54 has a spring loaded flapper valve 58. Both connectors have rear nipples 60 for attaching lines thereto, such as delivery line 20, return line 22, flexible hose sections 32 and 36 as well as couplings located at fuel tank 24, engine 26 or fuel injector 26*a*, pump 28 and other components of the vehicular fuel line installation.

Male connector 52 includes an O-ring seal 26 for seating within an internal groove 64 of female connector 54 to seal the connectors when mated. Female connector 54 includes a guide protrusion 66 for riding in a guide groove 68 in the male connector and providing a stop for engaging a shoulder 70 on the male connector. Female connector 54 includes a protrusion 72 for engaging and opening flapper valve 56 of the male connector. Finally, male connector 52 includes a sliding sleeve-like lock 74 having a front lip 72 which snaps into a peripheral locking groove 78 about the female connector.

Male and female connectors 52 and 54, respectively, of safety valves 34,38,44 are mated in the direction of arrows "A" (FIG. 2). During mating, the front nose of the male connector engages flapper valve 58 of the female connector, and protrusion 72 of the female connector engages flapper valve 56 of the male connector and open the flapper valves when the two halves or connectors of the safety valve are mated as seen in FIG. 3. When mated, O-ring seal 62 of the male connector snaps into interior groove 64 of the female connector, and guide protrusion 66 of the female connector rides in guide slot 68 of the male connector until the protrusion abuts stop 70. After the two connector halves are fully mated, slide lock 74 is pushed forward in the direction of arrow "B" (FIG. 3) until lip 76 of the slide lock rides over and outwardly along chamfered surfaces 80 (FIG. 2) at the front nose of the female connector. The sliding lock is moved in the direction of arrow "B" until lip 76 snaps into peripheral locking groove 78 about the female connector. Slide lock 74 can be made of appropriate flexible material, such as flexibly stiff plastic, so that lip 76 at the front end of the slide lock can expand and contract into locking groove 78. The flexibility of the slide lock also determines the tension forces required to separate connector halves 52 and 54 in response to forces opposite arrows "A" in FIG. 2.

In the event of a collision which would result in separating forces being applied to connector halves 52 and 54 opposite the directions of arrows "A" (FIG. 2), lip 76 of slide lock 74 will pull out of locking groove 78 of the female connector and allow the two connector halves to separate. With flapper valves 56 and 58 being spring loaded, the flapper valves will return to their closed positions shown in FIG. 2 and, thereby, prevent leakage or fuel line siphoning. It should be understood that, although a mechanically operable safety valve is shown in FIGS. 2 and 3, the invention also contemplates that a pressure-responsive safety valve can be used for safety valves 34, 38 and 44 in the vehicular fuel line installation described above in relation to FIG. 1. Such a pressure-responsive valve prevents fuel line siphoning in the event of a breakage in the fuel line installation at any point communicating with the pressure-responsive valve. In other words, if the pressure in the fuel line adjacent the pressure-responsive valve is lowered below the normal line pressure, for instance as a result of a line breakage, the valve at that point, such as the locations of valves 34, 38 and 44 in FIG. 1, would automatically close.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A safety system in a vehicular fuel line installation, comprising:

a fuel tank for storing a quantity of fuel;

an engine remote from the fuel tank;

delivery and return lines extending between the tank and the engine;

a pump operatively associated with the delivery line to feed fuel from the tank to the engine;

a safety valve in the delivery line at the pump for automatically closing in the event of an accident;

a safety valve in the delivery line at the engine;

a safety valve in the return line at the engine;

a safety valve in the return line at the tank;

a fuel filter in the delivery line;

a safety valve in the delivery line at each of an inlet side and an outlet side of the fuel filter;

a first flexible hose section in the delivery line;

a safety valve at each opposite end of the first flexible hose section;

a second flexible hose section in the return line; and a safety valve at each opposite end of the second flexible hose section.

2. The safety system of claim 1, including a vapor line extending between the fuel tank and the engine, and a safety valve in the vapor line at least at one of the fuel tank and the engine.

3. The safety system of claim 1 wherein said delivery and return lines and said safety valves all are located generally along a front-to-rear centerline of a vehicle.

4. The safety system of claim 1 wherein at least one of said safety valves includes a pair of mating halves which are separable in response to separation of the mating halves.

5. A safety system in a vehicular fuel line installation, comprising:

a fuel tank for storing a quantity of fuel;

an engine remote from the fuel tank;

delivery and return lines extending between the tank and the engine;

a pump operatively associated with the delivery line to feed fuel from the tank to the engine;

a safety valve in the delivery line at the pump for automatically closing in the event of an accident;

a safety valve in the delivery line at the engine;

a safety valve in the return line at the engine;

a safety valve in the return line at the tank;

a fuel filter in the delivery line; and a safety valve in the delivery line at each of an inlet side and an outlet side of the fuel filter.

6. The safety system of claim 5, including a vapor line extending between the fuel tank and the engine, and a safety valve in the vapor line at least at one of the fuel tank and the engine.

7. The safety system of claim 5 wherein said delivery and return lines and said safety valves all are located generally along a front-to-rear centerline of a vehicle.

8. The safety system of claim 5 wherein at least one of said safety valves includes a pair of mating halves which are separable in response to separation of the mating halves.

* * * * *